April 18, 1961  A. BECK  2,979,741
APPARATUS FOR CUTTING UNIFORM PITCH THREADS ON A
BLANK OF CYLINDRICAL AND CONICAL CONFIGURATION
Filed June 27, 1956
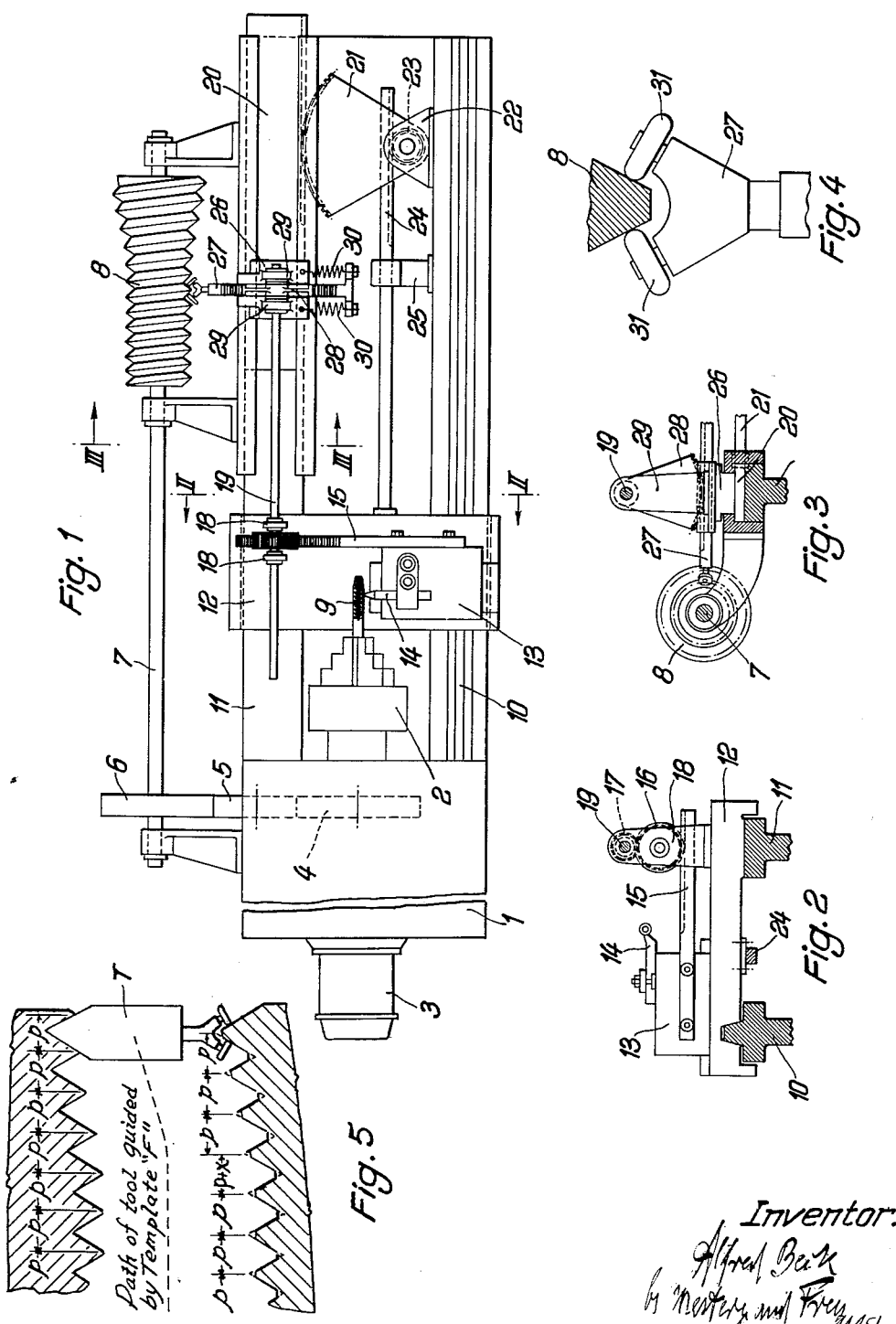
Inventor:
Alfred Beck

United States Patent Office 2,979,741
Patented Apr. 18, 1961

2,979,741

APPARATUS FOR CUTTING UNIFORM PITCH THREADS ON A BLANK OF CYLINDRICAL AND CONICAL CONFIGURATION

Alfred Beck, Hompeschstr. 6, Dusseldorf, Germany

Filed June 27, 1956, Ser. No. 594,150

1 Claim. (Cl. 10—105)

Threading tools have generally been made so that the teeth of the leading portion differ from the teeth of the chasing portion only in being cut away to an increasing extent. The bits of a die, for example, are first provided with everywhere uniform teeth of the chasing profile; then the teeth of the leading portion are ground off to an increasing extent along an oblique line. Threading tools having such bits require a comparatively large amount of power in cutting threads; moreover, threads cut by their means are less than perfect, particularly in surface finish.

To avoid these disadvantages, it has been proposed many years since that the leading portion of a threading tool be so made as to provide leading teeth having the precise pitch of the thread to be cut and the same shape as the chasing teeth, but set back from the chasing teeth to an increasing extent. Such tools have the advantage that the leading teeth following one another as a thread is cut, take off a comparatively small amount of stock, each penetrating a little deeper into the work than the preceding, and are comparable in action to a tool used to turn a thread on a lathe, cutting gradually deeper grooves in the work. In addition to substantially reduced power required, such threading tools have the advantage that threads cut therewith are no less perfect than threads cut on a lathe.

Peculiar difficulties arise in the making of threading tools of the latter kind in connection with proper guidance of the tool cutting the grooves in the part. While on the chasing portion of the part to be turned, the tool must cut uniformly spaced grooves in such part, on the transitional portion between the chasing and leading portions the tool must execute an additional motion so that the continuation grooves in the leading portion will again be uniformly spaced, but cut to increasing depth. Means have been proposed for accomplishing such an additional motion of the tool, but have failed of acceptance by reason of their rather complicated mechanism. Since there has been no simple and economical way to make them, therefore, such superior thread-cutting tools have not come into practical use.

The invention relates to a method of making thread-cutting tools whose leading teeth have precisely the pitch of the thread to be cut and are set back to an increasing extent preferably along a conical taper relative to the chasing teeth, on a lathe or the like, with the aid of a profile tool, for example a threading bit or grind wheel, having the profile of the grooves to be cut in the part. It makes it possible to turn such thread-cutting tools on a conventional lathe or similar machine tool with the aid of accessory guiding means that can readily be added, and that are simple in construction and reliable in performance.

The method according to the invention consists in that a tool having two faces at a preferably acute angle to each other is used to machine a helical groove of everywhere equal pitch and equal depth in a solid having a cylindrical portion corresponding to the chasing portion of the part to be made and a preferably conical taper portion of increasing diameter corresponding to the leading portion, and in that the adjacent flanks of two adjoining turns of the groove, which is to say the helical rib formed by the said flanks, serve as a solid template driven synchronously with the part to be machined for guiding the profile tool machining grooves in the parts to be turned on a lathe or the like.

Another object of the invention is a device, in particular a lathe with main and cross carriage, for making thread-cutting tools, wherein a solid template is employed to guide a profile tool mounted on the carriages and machining grooves in the parts. The device is constructed, according to the invention, so that a slide or the like, displaceable parallel to the axis of the solid template revolving synchronously with the part, bears a follower displaceable perpendicular to the axis of the template and held against the flanks of the helical rib of the template by spring action or the like, the displacement of the slide serving to guide the main carriage, and the displacement of the follower serving to guide the cross carriage, of the lathe.

The follower traveling along the helical rib of the template may preferably be forked, and provided with two rollers following the flanks of the rib. In order to achieve maximum precision in the making of thread-cutting tools, it is desirable that the template be comparatively large and that the motions of the slide and follower be transmitted to the carriages by reduction transmissions. If the slide and follower each actuate a servo motor to propel the supports, there results the advantage that the follower need be held against the rib of the template under relatively light pressure only.

The device according to the invention will now be more fully described with reference to the accompanying drawings, but it should be understood that these are given by way of illustration and not of limitation and that many changes in the details may be made without departing from the spirit of the invention.

In the drawings,

Fig. 1 shows a top view of an embodiment of a lathe with template constructed according to the invention to guide a threading bit;

Fig. 2 shows a section along the line II—II in Fig. 1;

Fig. 3 shows a section along the line III—III in Fig. 1;

Fig. 4 shows a detail, to an enlarged scale, of a follower traveling along the template;

Fig. 5 is a diagrammatic representation of the path of a tool when a template according to the invention is employed.

In the lathe shown in the drawing, the headstock 1, with spindle bearing a three-jaw chuck 2, is driven by a motor 3. A gear 4 mounted on the spindle, via a pinion 5 and gear 6, drives a shaft 7 bearing a solid template 8. The gear train 4, 5, 6 is such that the template 8 revolves synchronously with the three-jaw chuck 2. The three-jaw chuck 2 holds a part 9 from which a tap is to be made.

The bed of the lathe has two ways 10 and 11 upon which a main carriage 12 is displaceable. On the main carriage, a cross carriage 13 is displaceable, bearing a threading bit 14 with which grooves are machined in part 9. For exact adjustment of bit 14 to a desired radius, an additional manually displaceable holder bearing the bit 14 may be mounted on the cross carriage 13. The cross carriage 13 is provided with a rack 15 attached to its side and engaging a gear 16 and pinion 17 as illustrated in Fig. 2. The gear 16 and pinion 17 are mounted on bearings 18 provided on the main carriage 12, between which bearings the rack 15 is guided so as to ensure proper engagement. The bore of pinion 17 accommodates a longitudinally displaceable splined shaft 19 which imparts rotation to the pinion 17.

The way 11 of the bed of the lathe bears a longitudinally displaceable slide 20 provided on one lengthwise edge with rack teeth engaging a gear sector 21. The sector 21 is mounted in a bearing 22 on the bed of the lathe and is connected to a pinion 23 engaging a rack 24 attached to the main carriage 12. Rack 24 is provided with another bearing 25 to ensure proper engagement between it and pinion 23. Slide 20, as shown in Fig. 3, bears a superstructure 26 in which a follower 27 is slidably mounted. The superstructure 26 is of such height that the follower 27 is at the same level as the axis of the solid template 8, and that its displacement is radial to the said template.

The follower 27 is provided with gear teeth on its top surface, in engagement with a sector 28 fixed on the shaft 19, which is rotatably supported by bearings 29 on superstructure 26. The follower 27 is acted upon by two tension springs 30 tending to pull it towards the axis of the template 8. The portion of follower 27 acting in conjunction with the template 8, as shown in Fig. 4 to an enlarged scale, is forked; the prongs of the fork bear two rollers 31 following the flanks of the helical rib of template 8.

The template 8 is made from a blank having a cylindrical portion and a conical portion of increasing diameter. By means of the tool having two faces at an acute angle to each other, a helical groove of everywhere equal pitch and equal depth is machined in the blank. The result is a solid template 8 having a helical rib whose pitch in transition from the cylindrical to the conical portion varies in exact accordance with the pitch required for the groove to be machined in part 9 in order for the teeth of the leading portion to have the exact pitch of the threads to be cut in relation to the teeth of the chasing portion. Furthermore, the increase in distance of the rib of template 8 from its axis 7 agrees precisely with the diminution in radius to be followed in machining the groove in part 9 in order to produce properly set back leading teeth.

In forming the temperature by means of a lathe tool in accordance with the invention, at the transition zone only, the pitch of the threads is of an increased increment to compensate for the inherent decreased increment of pitch in the transition zone of the work piece.

The template is produced by providing therein a pitch having a positive increase of the distance $x$ (as may be seen in Fig. 5) in the transition zone only. When the thus produced threading is scanned at the points (not at the bottom), and the motion obtained thereby is transferred to the turning lathe tool T, which produces the screw tap, the positive increase $x$ occurring at the template provides the desired compensation for the pitch shortening in the transient zone of work blank 9, and the correct threading on the blank is thus obtained. This is the sense of the invention. It should be noted that in Fig. 5 the points of the threading of the template are cut off by flattening, outside as well as at the threading bottom. This is done in order to make it clear that these points need not be present physically, the important thing being rather the inclination of the thread flanks and the geometric position of their points of intersection.

The mode of operation of the lathe described is as follows. When the motor 3 of the lathe is started and the clutch, not shown, is engaged, part 9 and template 8 revolve synchronously. Follower 27, stationed at the righthand end of template 8 at the beginning of the cycle under consideration, causes slide 20 to move to the left owing to the helical form of the rib of template 8. At the same time, sector 21, pinion 23 and rack 24 move the main carriage 12 likewise to the left, so that the tool 14 is guided by the template 8.

In the embodiment illustrated, the template 8 is built about six times oversize. The transmission 21, 23 24 from slide 20 to the main carriage 12 has a corresponding reduction ratio of 1:6. While following the helical rib of template 8, follower 27, under the action of springs 30, is simultaneously displaced in the direction of the axis 7 of template 8. This motion is transmitted in reverse direction via sector 28, shaft 19, pinion 17 and gear 16 to the rack 15 of the cross carriage 13, so that the bit 14 is displaced corresponding to an increase in radial distance from the centerline of part 9, while the follower is reducing its radial distance from the axis 7 of template 8. Again, the transmission ratio between the follower 27 and the rack 15 of the cross carriage 13 is 1:6.

Thus the template 8 so controls the bit 14 machining a groove in part 9 that the machining of the groove produces a helical screw rib everywhere having exactly equal pitch, to the inclusion of the taper leading portion and the transition therefrom to the cylindrical chasing portion.

In the embodiment shown, the tool for machining the groove in part 9 is represented as a steel bit 14. Such a bit naturally cannot cut a groove of the required depth in part 9 with one cut. Therefore numerous cuts must be taken in succession, for each of which the bit 14 must be advanced by a small amount. If a profile miller is used instead of the bit 14, then if the rate of feed of part 9 and template 8 is sufficiently low, a groove of the required depth can be machined in one cut. In the same way, a profile grind wheel may be used, if provision is made for cooling part 9 by playing liquid coolant upon it.

After the groove has been machined in part 9, it remains only to machine the flutings for chip clearance in part 9 in order to complete the finished tap.

What I claim is:

In a lathe for making threading tools from blanks, each blank comprising a conical portion adjoining a cylindrical portion, in combination: rotatable clamping means adapted to receive said blank; a profiled tool; a support for said tool, said support being shiftably mounted in directions parallel and at right angles to the axis of rotation of said clamping means; drive means for rotating said clamping means; a rotatably mounted template in driving connection with said rotatable clamping means, the transmission ratio of said drive connection equalling unity, said template comprising a body consisting of a frustoconical portion of increasing diameter adjoining a cylindrical portion and having a transition zone therebetween, both said portions being formed with substantially full depth threads defined by forward and rear flanks, the flanks of the threads in both the cylindrical and conical sections respectively being parallel, the pitch of the flanks in said transition zone only being of an increased increment to compensate for the inherent decreased increment of pitch in the transition zone of the workpiece incident to the displacement of the tool towards the workpiece corresponding to the taper of the workpiece section.

References Cited in the file of this patent

UNITED STATES PATENTS

| | | |
|---|---|---|
| 1,656,598 | Merrifield | Jan. 17, 1928 |
| 1,693,768 | Steinruck | Dec. 4, 1928 |
| 2,593,310 | Johnson | Apr. 15, 1952 |

FOREIGN PATENTS

| | | |
|---|---|---|
| 395,873 | Germany | May 24, 1924 |
| 997,929 | France | Sept. 19, 1951 |
| 1,035,355 | France | Apr. 15, 1953 |